(12) United States Patent
Michels et al.

(10) Patent No.: US 6,239,225 B1
(45) Date of Patent: May 29, 2001

(54) PROCESS FOR THE MANUFACTURE OF IMPACT RESISTANT MODIFIED POLYMERS

(75) Inventors: Gisbert Michels, Cologne; Bernd Klinksiek, Bergisch-Gladbach; Otto Schmid, Leverkusen, all of (DE); Ralph Ostarek; Richard Weider, both of Longmeadow, MA (US); Raymond D. Burk, Wilbraham, MA (US); Joong-In Kim, Amherst, MA (US)

(73) Assignees: Bayer Corporation, Pittsburgh, PA (US); Bayer Aktiengesellschaft, Leverkhusen (DE)

( * ) Notice: Subject to any disclaimer, the term of this patent is extended or adjusted under 35 U.S.C. 154(b) by 0 days.

(21) Appl. No.: 09/350,228

(22) Filed: Jul. 8, 1999

(51) Int. Cl.[7] .................................................. C08F 25/02

(52) U.S. Cl. ............................................................ 525/242

(58) Field of Search ............................................. 525/242

(56) References Cited

U.S. PATENT DOCUMENTS

| | | | |
|---|---|---|---|
| 5,116,536 | 5/1992 | Bucheler et al. | 252/314 |
| 5,210,132 | 5/1993 | Matsubara et al. | 525/53 |
| 5,278,253 | 1/1994 | Baumgartner et al. | 525/316 |
| 5,349,012 | 9/1994 | Fujita et al. | 525/52 |
| 5,514,750 | 5/1996 | Cantrill et al. | 525/52 |
| 5,550,186 | 8/1996 | Cantrill et al. | 525/52 |
| 5,723,518 | 3/1998 | Kahl et al. | 523/324 |

FOREIGN PATENT DOCUMENTS

| | | |
|---|---|---|
| 43 21 196 | 1/1995 | (DE) . |
| 4-80203 | 3/1992 | (JP) . |

*Primary Examiner*—Terressa M. Boykin
(74) *Attorney, Agent, or Firm*—Joseph C. Gil; Aron Preis

(57) ABSTRACT

A continuous process for the manufacture of impact resistant polymers is disclosed. The process comprise polymerization of a reaction mixture containing vinylaromatic monomers in the presence of soluble rubber and entails shearing at least some of said mixture at a rate of more than 30000 1/s using a device having no rotating parts. The resulting product is characterized in its low gloss and improved impact properties.

36 Claims, No Drawings

PROCESS FOR THE MANUFACTURE OF IMPACT RESISTANT MODIFIED POLYMERS

BACKGROUND OF THE INVENTION

The invention concerns a process for the manufacture of impact resistant modified polymers by polymerization, especially by radical polymerization of vinyl-aromatic monomers and ethylene unsaturated nitrile monomers in the presence of soluble rubber.

Impact resistant modified polymers manufactured by radical polymerization of aromatic monomers and ethylene unsaturated nitrile monomers in the presence of rubber are known under the name "ABS polymers" or "ABS molding material" (acrylonitrile-butadiene-styrene). Another type of impact resistant modified polymers, known as "HI-PS" polymers (high impact polystyrene), are obtained by polymerization of vinyl-aromatic monomer in the presence of rubber.

Advantageous for ABS manufactured by solution or mass polymerization is the higher rubber efficiency and the avoidance of wastewater, as well as the smaller usage of pigments due to the lighter natural color compared to ABS manufactured by the emulsion process. Disadvantageous for ABS manufactured in mass or solution polymerization is the lack of surface luster (herein "gloss") compared to ABS manufactured by emulsion polymerization. The lower gloss is the result of the relatively large, dispersed rubber particles. There was, therefore, no shortage of attempts to eliminate this disadvantage and manufacture lustrous/glossy ABS in mass or solution polymerization.

A continuous process for the manufacture of ABS polymerizates is described in DE 4 030 352 in which the phase inversion takes place in a Ringspalt reactor, in which the rubber phase passes over from the outer phase to the inner separated phase, and accordingly the polystyrene co-acrylonitrile phase from the inner phase to the outer connected phase. A disadvantage is that at least three reactors are needed for continuous polymerization, and that the shearing stress prevailing in the Ringspalt reactor is relatively small.

Continuous processes for the manufacture of presently relevant resin were described in JP 0408020 and in U.S. Pat. No. 5,210,132 (corresponding to EP-A376 232). In the process disclosed in the '020 document, the reaction solution is sheared by the use of a particle dispenser having wings or rotors rotating at high and low speeds alternatively. The dispersion of the rubber particles is said to be controlled by the speed of the rotation. The process disclosed in the '132 document refers to shear rates which are preferably equal to or greater than 300 $s^{-1}$ The application of shear is by a particle disperser having one shearing stirrer composed of rotatable blade or cylindrical rotor rotating at a high speed. The maximum shear rate demonstrated in the example (Example 33) is less than 3000 1/s and there is no indication at all of the criticality of shear rate to the reduction in particle size or the width of the particle size distribution. In fact, the document in column 12, lines 27–39, relates the distribution of the particles to the reaction conditions. Moreover, the working and comparative examples provide no suggestion respecting the present invention which resides, in part, in the finding of critical dependence of both the reduction in particle size and narrowing of the particle size distribution on the shear rate. Also presently relevant are U.S. Pat. Nos. 5,514,750 and 5,550,186 which disclosed the application of shear in relevant processes. Shear rates in the range of 2–2000 1/s were disclosed and higher shear rates were taught away from (see col. 10, line 43 in the '750 patent and col. 11, line 53 in the '186 patent). The disadvantage of the prior art processes is the energy inefficient operation of the rotor/stator/machinery, which leads first to heating of the reaction material, and only second to the breaking up of the rubber particles.

The inventive process relates to a continuous manufacture of impact resistant modified polymers having increased gloss and improved impact properties. The process comprises polymerization, preferably free-radical polymerization, of vinyl-aromatic monomers with or without ethylene unsaturated nitrile comonomers, in the presence of a soluble rubber and optionally in the presence of solvents. In the process, upon completion of the phase inversion, at least part of the reaction mixture is sheared at a rate of at least 30,000, preferably 35,000 to 20,000,0001/s using a device which entails no rotating parts. In view of the state of the art, it was surprising that such high shear rates do not lead to a breakdown of the phases, and that the process may be carried out in the presence of a solvent. It is also surprising that the process achieves higher gloss of the impact resistant modified polymers obtained. It is also surprising that a reaction mixture containing polymerizable mixture and potentially gel forming and easily crosslinkable rubbers can be subjected to high shear rates without formation of gel particles, hard spots or pluggage of the dispersing devices.

The process is preferably carried out in two or more reactors arranged in sequence. Stirred tank reactors with or without recycle loop, tower reactors or plug flow reactors, may be used and they may be filled or partially filled. Preferred are the homogeneous agitated reactors and plug flow reactors. In the case where two reactors are used, the monomer conversion in the first reactor is already sufficiently high that the first reactor is past the phase inversion, i.e., that rubber particles exist in a predispersed form. In cases where three or more reactors are used, it is possible to operate all three reactors after the phase inversion, or, the first reactor before, and the second and third reactors after the phase inversion. The inventive process is preferably carried out in two or three stirred tank reactors. In a specially preferred embodiment, the process is carried out in two such reactors.

The high shear rates may be generated by pumping the reaction mixture through static dispersing devices, containing no rotating parts, at high pressures. A static mixer may be used as a dispersing device. Common to all static mixers is that a liquid flow in a tube is constantly separated, relocated, combined, and redistributed by internal components. The pressure energy available is thereby dissipated in small volumes.

Also, a jet dispergator may be used as a dispersing device in which the pressure energy is dissipated in small volumes in a pressure relief nozzle. Other suitable static dispersion devices include microporous filters, microporous glass filters microfluidizers and Manton-Gaulin homogenizer nozzles. The jet dispergator is the preferred device.

A critical aspect of the invention therefore resides in that the weight average particle size of the rubber (herein "$d_w$") decreases, and the width of the size distribution of the particles (herein "$d_w/d_n$", where $d_n$ denotes the number average particle size) narrows by shearing in accordance with the inventive process. In accordance with the inventive process, the application of shear at the inventive rate reduces dw and $d_w/d_n$ by at least 20%, preferably by at least 30% relative to the values obtained by the process but for the application of shear stress at the prescribed rate. This application of shear stress is upon the completion of the phase inversion. A jet dispergator contains a pressure relief nozzle in which the available pressure energy is dissipated in the smallest possible volume in a dispersion zone, and with this a high volume specific dispersion power is achieved. Suitable design types are described in DE 195 10 651 (FIGS. 1, 2 and 6) and in EP 101 007 A2 (FIGS. 2, 3 and 4).

Suitable static mixers include the ones available from Sulzer company, Winterthur, Switzerland/Germany (Commercial identification SMX). Common to all static mixers is that liquid flow in a tube is constantly distributed, relocated, combined and re-distributed by internal components. The static mixers are thereby operated in a way similar to the jet dispergator, i.e., the available pressure energy is dissipated in the static mixer.

The volumetric flow at which the polymer solution which contains rubber particles is transported through the shearing equipment is so high that a pressure drop of 2 to 500 bar, preferably between 2 and 50 bar develops. The operating pressure of 2 to 50 bars can be generated with relatively simple and inexpensive pumps. The shear rate (speed gradient, shearing speed) in the shearing equipment is high: at least 30,000 $s^{-1}$, preferably 35,000 to 20,000,000 $s^{-1}$ most preferably 35,000 to 1,500,000 $s^{-1}$. This shear rate is set by the pressure drop. The advantage of jet dispergators lies in the fact that the energy density is very high: a value of $10^7$ W/cm$^3$ is obtained at a 10 bar pressure drop for the jet dispergator, a value of $10^8$ W/cm$^3$ at 50 bar. In comparison, the energy density with rotor/stator machinery is considerably smaller: $10^4$–$10^5$ W/cm$^3$. The application of shear in accordance with the inventive process may be carried out by any device through which the rubber particle containing polymer solution may be pumped, and where high shear rates and/or high volume specific dispersion power is attainable. The invention is therefore not restricted to the use of the preferred jet dispergators and static mixers.

The shearing is carried out after the phase inversion. The monomer conversion at which the phase inversion takes place, i.e., the stage at which the rubber phase inverts from the continuous outer phase to the inner separated phase, and rubber particles develop thereby, depends on the rubber concentration, monomer composition, and the concentration, type and quantity of the solvent.

The inventive process is directed to continuous manufacture of ABS or HI-PS polymers which are suitable as thermoplastic molding resins yielding articles having high gloss. The process comprises polymerization of vinyl-aromatic monomers with or without ethylene unsaturated nitrile monomers, in the presence of soluble rubber, and may be carried out in the presence of solvents, preferably in at least two reactors arranged in sequence. The application of high shear after phase inversion leads to a reduction of the particle size of the rubber and a narrowing of the width of the particle size distribution. The shearing is preferably carried out by jet dispergator or by a static mixer. In a corresponding process where no shearing stress is applied the resulting polymers have coarser rubber particles and exhibit lower gloss values.

In an additional embodiment of the invention, products having a bimodal distribution of particle size are prepared by subjecting only part of the reaction mixture to-the shear. These products are characterized by their improved impact properties.

The shearing equipment to be used in the inventive process in reducing the particle size of the rubber may be installed in a re-circulation loop of the reactor which is the first one following the phase inversion, advantageously a stirred tank reactor. Alternatively, the shearing equipment is installed between two reactors. Preferred in this case is that the shearing equipment be installed between the reactor in which the phase inversion takes place and the reactor following it.

During polymerization, a solution of the rubber in the monomers, and optionally solvents, is metered continuously into the reactors that are arranged in sequence. The polymerization solution from the first reactor is continuously fed into the following reactor. If more than two reactors are used, the operation is repeated in the same way. The monomer conversion in the last reactor of the cascade is 30 to 95%, the solid content is 30 to 90 weight %. The polymerization is advantageously initiated by a radical-forming initiator but may also be thermally-initiated; the molecular weight of the polymer formed may be adjusted by the use of well known chain transfer agents. Residual monomers and solvents may be removed by conventional methods (for example, in heat exchanger evaporators, falling film evaporators, extrusion evaporators, thin film or thin layer evaporators, screw evaporators, agitated multi-phase evaporators with kneading and scraping devices), and stripping agents, for example steam, may be incorporated in the inventive process. During the polymerization and the polymer isolation steps, additives, stabilizers, antioxidants, fillers, lubricants and colorants may be added.

Suitable vinyl-aromatic monomers include styrene, α-methyl styrene, which may optionally be alkyl-substituted or chlorine-substituted. Styrene and α-methyl styrene are preferred. The suitable ethylene unsaturated nitrile monomers include acrylonitrile and methacrylonitrile.

Additional monomers may be included in the reaction mixture in an amount of up to 20% of the total weight of its monomers. These include acrylic monomers (for example, methyl(meth)acrylate, ethyl(meth)acrylate, tert-butyl-(meth)acrylate, n-butyl(meth)acrylate) maleic acid derivatives (for example, maleic anhydride, maleic acid ester, n-substituted maleinimide) acrylic acid, methacrylic acid, fumaric acid, itaconic acid, and the corresponding amides and esters (for example, butylacrylate and dibutyl-fumarate). Examples of n-substituted maleinimides are n-cyclohexyl, n-phenyl, n-alkyl-phenyl-maleinimide.

The weight ratio of vinyl-aromatic monomers to ethylene unsaturated nitrile monomers is, for ABS manufacture, 60-90/40-10.

Suitable rubbers are soluble in the reaction mixture at the process temperature and include polybutadiene, styrene-butadiene copolymers in statistical and/or block form, acrylonitrile-butadiene copolymers, chloroprene rubbers, and ethylene-propylene rubbers. The solution viscosity of such soluble rubbers, determined on their solution (5 weight %) in styrene is 10 to 200 mPa·s. The molding resin (ABS or HIPS) manufactured based on the inventive process contains rubber in an amount of 5 to 35% relative to the weight of the resin.

Solvent suitable in carrying out the polymerization in one relevant embodiment of the invention are aromatic hydrocarbons such as toluene, ethylbenzene, xylenes and ketones such as acetone, methylethylketone, methylpropylketone, methylbutylketone, as well as mixtures of these solvents. Preferred are ethylbenzene, methylethylketone and acetone, as well as their mixtures.

The average polymerization process residence time is 1 to 10 hours. The polymerization temperature is 50 to 180° C.

Initiators for radical polymerization are well known. Examples include azodiisobutyric acid dinitrile, azoisobutyric acid alkylester, tert-butylperpivalate, tert-butylperoctoate, tert-butylperbenzoate, tert-butylpemeodekanoate, tert-butylper-(2-ethylhexyl) carbonate.

These initiators may be used in quantities of 0.005 to 1 weight % in reference to the monomers.

In order to adjust the molecular weights, conventional chain transfer agents may be used in amounts of 0.05 to 2 weight % relative to the reaction mixture. These include mercaptans and olefins, for example, tert-dodecylmercaptan, n-dodecylmercaptan, cyclohexene, terpinolene, and α-methylstyrene dimers.

The products obtained based on the inventive process have rubber particle sizes (weight average $d_w$) of 0.1–10 μm, preferably 0.1–1 μm. The products based on the inventive process preferably show a melt index of 1–60 (220° C./10 kg) [ml/10 min].

The molding material based on the inventive process may be processed thermoplastically, including the known methods of injection molding, extrusion, spray molding, calendering, blow molding, pressing and sintering.

The advantage of the inventive process is that with the application of high shearing forces, using the high shearing forces of a jet dispergator or static mixer, the rubber particle size of HI-PS or ABS may be reduced resulting in lusterous, that is glossy, products. Without shearing, the products contain coarse particles and exhibit lower gloss, and insufficient impact toughness.

The invention is further illustrated but is not intended to be limited by the following examples in which all parts and percentages are by weight unless otherwise specified.

EXAMPLES

Measurement Methods

The conversion is determined by the measure of the solid content of the reaction mixture after drying at 200° C. The rubber content in the final product was determined by material balance. Gel content was determined with acetone as the dispersion medium. The Staudinger Index of the soluble portion was determined using dimethylformamide and 1 g/l LiCl as solvent. The particle size and distribution was measured by centrifugation as described in U.S. Pat. No. 5,166,261; deviating from it, a dispersion of rubber particles in propylene carbonate was injected into a mixture of propylene carbonatelacetone (75:25); the weight average ($d_W$), and the number average ($d_N$) is indicated. The width of the particle size distribution is listed as the quotient ($d_W/d_N$). The impact toughness, notched Izod, was measured at 23° C. and −20° C. in accordance with ISO 180/1A, the thermal stability (Vicat B/120) in accordance with ASTM D 1525, the melt volume index (MVI 220° C./10 kg) according to DIN 53735, the hardness (HC 30″) according to ISO 2039, and gloss in accordance with DIN 67530 at an angle of 20°. The values were measured on an injection molded specimen.

Examples 1–5 Comparative Example 1–2

The continuous polymerization was carried out in a reactor cascade consisting of two agitated, partially filled laboratory reactors with helical ribbon agitators (Reactor volumes: 5 and 10 liters) and at a pressure of 8–10 bar; the agitator speed was 70 rpm in the first reactor and 20 rpm in the second reactor. The shearing equipment was installed in the loop of the first reactor or between both reactors. A jet dispergator with two holes, each 0.7 mm diameter, was used in carrying out Example 1 and 2. A corresponding dispergator having eight holes, each 0.7 mm diameter, was used in Example 3; a dispergator having two holes, each 0.5 mm in diameter, was used in Example 5 and one with 16 holes, each 0.75 mm in diameter, was used in comparison Example 2. A static mixer /SMX 8 (diameter: 8 mm, length: 48 mm) from Sulzer company, of Winterthur, Switzerland was used in carrying out Example 4. The solutions were pumped using a membrane pump through the jet dispergator or static mixer. The rubber (Buna HX 565 TC polybutadiene, from Bayer AG, Leverkusen, Germany, having solvent viscosity of 44 mPa·s as a 5% solution in styrene at 25° C.) in a solution containing styrene, acrylonitrile, methylethylketone (MEK) and a stabilizer (the stabilizer having no criticality in the present context) at 40–50° C. under nitrogen blanketing, as well as the Feed solution I, including chemical initiator, chain transfer agent and methylethylketone, were continuously metered into reactor 1 (5 liter volume). The Feed solution II, including chemical initiator, chain transfer agent and methylethylketone, as well as the reaction solution taken from reactor 1 were continuously metered into reactor II (10 liter volume). The filling levels of the partially filled reactors that were mounted on scales are kept constant; the same amount of reaction solution was pumped out as the solutions that were metered in. A stabilizer solution III, containing MEK and thermal stabilizers (having no criticality in the present context) in the amounts shown was metered into the discharge of reactor II and was mixed with this flow. The polymer solution was devolatilized under vacuum, and the resulting strand was cut into granules. The granules were compounded conventionally and used in molding test specimens. The composition of the solutions, the flow rates of the metering streams, the average residence time, the materials in the reactor contents, and the reactor temperatures, as well as solid content and monomer conversions, furthermore, the throughput for the jet dispergator or static mixer, the pressure drop across the jet dispergator or static mixer, and the resulting particle sizes of the granulates, as well as other physical data are presented in the following tables.

TABLE 1

Type and Installation of the Shearing Equipment

| | Example 1 | Example 2 | Example 3 | Example 4 | Example 5 | Comparison Example 1 | Comparison Example 2 |
|---|---|---|---|---|---|---|---|
| Shearing equipment Installation | Jet dispergator Loop Reactor 1 | Jet dispergator Loop Reactor 1 | Jet dispergator Between Reactor 1 and 2 | Static mixer Loop Reactor 1 | Jet dispergator Between Reactor 1 and 2 | Without | Jet dispergator Between Reactor 1 and 2 |

The Comparison Examples yielded products having coarser particles, wider distribution of the particle size and lower gloss than the products of Examples 1–5.

The operating conditions and material parameters describing the experiments are shown in the following tables.

The feed solutions are described in Table 2 in terms of their components and rates.

In the tables which follow, g denotes grams, hr denotes hour; μm denotes microns; $d_W$, and $d_n$ respectively denote, weight average particle size, and number average particle size. The width of the distribution is the ratio $d_w/d_n$. MVI refers to melt flow index. The chain transfer agents were conventional and the chemical initiators and stabilizers indicated below are not critical to the invention.

TABLE 2

|  | Example 1 | Example 2 | Example 3 | Example 4 | Example 5 | Comparative Example 1 | Comparative Example 2 |
|---|---|---|---|---|---|---|---|
| feed rate of Rubber solution, g/hr | 1887.8 | 1869.7 | 1573.2 | 1573.2 | 1200.0 | 1573.2 | 1200.0 |
| Polybutadiene, g | 13214 | 12598 | 12585 | 12585 | 15407 | 12585 | 15407 |
| stabilizer, g | — | — | — | — | 112.9 | — | 112.9 |
| MEK, g | 17619 | 22676 | 16780 | 16780 | 21933 | 16780 | 21933 |
| Styrene, g | 95166 | 90276 | 90635 | 90635 | 95406 | 90635 | 95406 |
| Acrylonitrile, g | 32574 | 31054 | 31023 | 31023 | 32591 | 31023 | 32591 |
| Feed solution I g/hr | 108.2 | 73.0 | 90.1 | 90.1 | 85.4 | 90.1 | 85.3 |
| MEK, g | 8810 | 5879 | 8390 | 8390 | 9063 | 8390 | 9063 |
| chain transfer agent | 191.6 | 182.7 | 182.5 | 182.5 | 105.1 | 182.5 | 105.1 |
| chemical initiator, g | 104.7 | 66.5 | 72.7 | 72.7 | 55.8 | 72.7 | 46.5 |
| Feed solution II g/hr | 116.8 | 66.7 | 101.3 | 101.3 | 63.8 | 101.3 | 64.3 |
| MEK, g | 8810 | 5039 | 8390 | 8390 | 3444 | 8390 | 3444 |
| styrene |  |  |  |  | 2497 |  | 2497 |
| Acrylonitrile, g | — | — | — | — | 920 | — | 920 |
| chain transfer agent, g | 958 | 548 | 1155.7 | 1155.7 | 26.3 | 1155.7 | 65.7 |
| chemical initiator, g | 44.7 | 13.4 | 182.5 | 182.5 | 6.6 | 182.5 | 13.1 |
| Stabilizer solution III g/hr | 320.9 | 405.9 | 267.4 | 267.4 | 253.8 | 267.4 | 253.8 |
| MEK, g | 26429 | 33594 | 25170 | 25170 | 27169 | 25170 | 27169 |
| thermal stabilizer, g | 528 | 504 | 503 | 503 | 226 | 503 | 226 |

TABLE 3

|  | Example 1 | Example 2 | Example 3 | Example 4 | Example 5 | Comparative example 1 | Comparative example 2 |
|---|---|---|---|---|---|---|---|
| Reactor 1 |  |  |  |  |  |  |  |
| Residence time [min] | 60 | 60 | 76.4 | 76.4 | 90 | 76.4 | 90 |
| Reactor content [g] | 1996 | 1922 | 2118 | 2118 | 2426 | 2118 | 2426 |
| Reactor temperature [° C.] | 85 | 85 | 85 | 85 | 85 | 85 | 85 |
| Solid content (wt. %) | 20.8 | 21.4 | 21.4 | 21.7 | 23.5 | 21.0 | 22.2 |
| Monomer conversion (%) | 16.7 | 18.1 | 17.5 | 17.9 | 19.8 | 17.0 | 18.1 |
| Gel content (wt. %) | 53.4 | 46.7 | 53.8 | 53.1 |  | 52.8 |  |
| Rubber content (wt. %) | 37.9 | 36.1 | 36.8 | 36.3 | 44.6 | 37.5 | 48.8 |
| Staudinger index dL/g | 0.68 | 0.77 | 0.83 | 0.83 |  | 0.83 |  |
| Reactor II |  |  |  |  |  |  |  |
| Residence time [min] | 120 | 120 | 120 | 120 | 111 | 120 | 126 |
| Reactor content (grams) | 4226 | 4020 | 3529 | 3529 | 3111 | 3529 | 3531 |
| Reactor temperature (° C.) | 145 | 145 | 115 | 115 | 135 | 115 | 135 |

TABLE 3-continued

|  | Example 1 | Example 2 | Example 3 | Example 4 | Example 5 | Comparative example 1 | Comparative example 2 |
|---|---|---|---|---|---|---|---|
| Solid content (wt. %) | 61.5 | 60.7 | 59.4 | 57.3 | 57.5 | 59.2 | 57.5 |
| Monomer conversion (%) | 74.1 | 73.1 | 71.1 | 68.2 | 67.5 | 70.8 | 67.5 |
| Gel content (wt. %) | 22.6 | 20.3 | 22.8 | 23.4 |  | 22.7 |  |
| Rubber content (wt. %) | 12.0 | 12.2 | 12.4 | 12.9 | 14.8 | 12.5 | 14.8 |
| Staudinger index (dL/g) | 0.54 | 0.57 | 0.55 | 0.53 |  | 0.55 |  |

TABLE 4

|  | Example 1 | Example 2 | Example 3 | Example 4 | Example 5 | Comparative Example 1 | Comparative Example 2 |
|---|---|---|---|---|---|---|---|
| Throughput, jet dispergator [liter/hr] | 58 | 43 | 48 | — | 85.7 | — | 14.3 |
| Throughput, static mixer [kg/hr] | — | — | — | 23 | — |  |  |
| number of holes in dispergator | 2 | 2 | 8 |  | 2 | none | 16 |
| hole diameter (mm) | 0.7 | 0.7 | 0.7 |  | 0.5 | — | 0.75 |
| Pressure drop | 28.1 | 14.0 | 4.25 | 4.9 | 20.5 | — | 2.4 |
| Particle size [μm] |  |  |  |  |  |  |  |
| $d_W$ | 0.326 | 0.366 | 0.383 | 0.442 | 0.404 | 0.774 | 1.237 |
| $d_N$ | 0.09 | 0.147 | 0.119 | 0.143 | 0.178 | 0.125 | 0.192 |
| Width of Distribution | 3.62 | 2.49 | 3.22 | 3.09 | 2.26 | 6.19 | 6.43 |
| shear rate, 1/s | $2.39 \times 10^5$ | $1.77 \times 10^5$ | $.49 \times 10^5$ |  | $9.69 \times 10^5$ | none | $5.9 \times 10^3$ |
| Notched Izod, 23° C. [kJ/m²] | 8.9 | 13.1 | 10.4 | 10.2 |  | 10.3 |  |
| Notched Izod, −20° C. [kJ/m²] | 5.7 | 7.8 | 6.9 | 6.4 |  | 6.5 |  |
| Vicat B/120 [° C.] | 99 | 101 | 99 | 98 |  | 99 |  |
| MVI (220° C./10 kg) [ml/10 min] | 46.7 | 39 | 40.5 | 43.5 | 4.1 | 40.9 | 4.2 |
| Hardness (HC 30") [MPa] | 113 | 104 | 109 | 110 |  | 109 |  |
| Surface gloss 20° | 93.3 | 85.9 | 88.5 | 89.5 |  | 54.2 |  |

In the table above, the shear rate (A) has been calculated in accordance with the following model:

$$(A) = (4)(\text{flow rate})/(3.14)(\text{number of holes})(\text{hole radius})^3$$

where the flow rate is in m³/sec and the hole radius is expressed in meters.

In an additional set of experiments, comparable materials were processed under different shear rates and the corresponding parameters, $d_w$ and $d_w/d_n$ were determined as shown in Table 5.

TABLE 5

| shear rate, 1/s | $d_w$ | $d_w/d_n$ |
|---|---|---|
| 60 | 1.45 | 3.37 |
| 70000 | 0.71 | 4.12 |
| 100000 | 0.54 | 3.16 |
| 130000 | 0.45 | 2.74 |
| 166000 | 0.43 | 2.47 |

The data clearly demonstrate the critical dependence of the properties of the products on the shear rate. The shear rate determines the width of the size distribution and the gloss values of the products.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process, entailing phase inversion, for the manufacture of an impact resistant, rubber containing polymer comprising (a) polymerizing a reaction mixture containing vinylaromatic monomers in the presence of soluble rubber and, upon completion of said phase inversion (b) shearing at least some of said mixture at a rate of at least 30,000/s, said shearing applied in the absence of rotating parts.

2. The process of claim 1 wherein said reaction mixture further contains ethylene unsaturated nitrile monomers.

3. The process of claim 1 wherein polymerizing is a free radical polymerization.

4. The process of claim 3 wherein polymerizing is thermally initiated.

5. The process of claim 3 wherein polymerizing is chemically initiated.

6. The process of claim 1 wherein the reaction mixture further comprises at least one copolymerizable monomer selected from the group consisting of acrylate, methacrylate, fumarate, maleate, and N-aryl-substituted maleic acid imide.

7. The process of claim 1 wherein polymerizing is carried out in the presence of at least one solvent.

8. The process of claim 1 carried out in at least two stirred tank reactors arranged in sequence.

9. The process of claim 1 where shearing is applied by at least one static dispersing device selected from the group consisting of static mixer, jet dispergator, microporous filter, microfluidizer and Manton-Gaulin homogenizer nozzle.

10. The process of claim 9 where shearing is applied by a static mixer.

11. The process of claim 9 where shearing is applied by jet dispergator.

12. The process of claim 1 wherein shearing is carried out with a power density of more than $10^6$ W/cm$^3$.

13. The process of claim 9 wherein shearing is carried out with a power density of $10^7$ W/cm$^3$ to $10^8$ W/cm$^3$.

14. The process of claim 1 wherein shearing comprises a pressure relief nozzle operated with a pressure difference of more than 2 bar.

15. The process of claim 1 wherein shearing comprise a pressure relief nozzle operated with a pressure difference of 2 to 500 bar.

16. The process of claim 1 wherein shearing is carried out in a loop of a reaction vessel.

17. The process of claim 8 wherein shearing is carried out in a transfer line of said reaction mixture from one reactor to the other reactor.

18. The process of claim 1 wherein vinylaromatic monomer is at least one member selected from the group consisting of styrene, α-methyl styrene, alkyl-substituted styrene, chlorine-substituted styrene, alkyl-substituted α-methyl styrene and chlorine-substituted α-methyl styrene.

19. The process of claim 2 wherein ethylene unsaturated nitrile monomer is at least one member selected from the group consisting of acrylonitrile and methacrylonitrile.

20. The process of claim 19 wherein said reaction mixture further contains, up to 10 percent relative to the weight of the mixture, of at least one member selected from the group consisting of dibutylfumarate, butylacrylate, methylmethacrylate and N-phenyl-maleicimide.

21. The process of claim 2 wherein vinylaromatic monomers and ethylene unsaturated nitrile monomers relate by weight as 60-90/40-10.

22. The process of claim 1 wherein rubber is a member selected from the group consisting of soluble polybutadienes, soluble styrene-butadiene-copolymers in statistic form, soluble styrene-butadiene-copolymers in block form, soluble acrylonitrile-butadiene-copolymer, soluble chloroprene rubber and soluble ethylene-propylene rubber.

23. The polymer prepared by the process of claim 1.

24. The polymer of claim 23 characterized in that it contains rubber in an amount of 5 to 35% relative to its weight.

25. The process of claim 7 wherein solvent is an aromatic hydrocarbon.

26. The process of claim 25 wherein hydrocarbon is at least one member selected from the group consisting of toluene, ethylbenzene and xylene.

27. The process of claim 7 wherein solvent is at least one member selected from the group consisting of acetone, methylethylketone, methylpropylketone and methylbutylketone.

28. The process of claim 1 wherein reaction mixture further contains at least one chain transfer agent selected from the group consisting of mercaptan and olefin in an amount of 0.05 to 2 percent by weight relative to the total weight of said mixture.

29. The process of claim 28 wherein the chain transfer agent is selected from the group consisting of tert-dodecylmercaptans, n-dodecylmercaptans, cyclohexene, terpinolene and α-methylstyrene dimer.

30. The process of claim 1 wherein shearing is at a rate of 30,000 to 20,000,000s$^{-1}$.

31. The polymer of claim 23 wherein rubber is in the form of particles having a size (weight average $d_W$) of about 0.1 to 10 microns.

32. The polymer of claim 23 wherein rubber is in the form of particles having a size (weight average $d_W$) is about 0.1 to 1 microns.

33. The polymer of claim 23 wherein rubber particles are characterized in that the ratio $d_W/d_N$ thereof is less than 5.

34. The polymer prepared by the process of claim 1 characterized in having a bimodal particle size distribution of said rubber.

35. A continuous process, entailing phase inversion, for the manufacture of an impact resistant, rubber containing polymer comprising (a) polymerizing a reaction mixture containing vinylaromatic monomers in the presence of soluble rubber and, upon completion of said phase inversion (b) shearing at least some of said mixture at a rate sufficient to reduce each of $d_w$ and $d_w/d_n$ by at least 20% relative to their values obtained by the corresponding process except for the application of shear.

36. The process of claim 35 wherein said rate is sufficient to reduce each of $d_w$ and $d_w/d_n$ by at least 30% relative to their values obtained by the corresponding process except for the application of shear.

* * * * *